Figure 1:
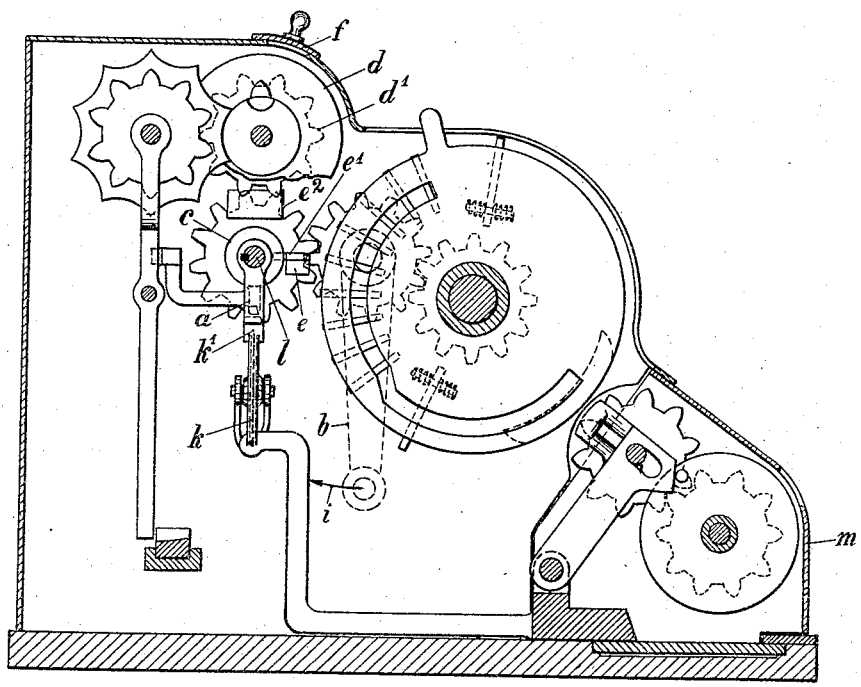

F. TRINKS.
CALCULATING MACHINE.
APPLICATION FILED OCT. 21, 1908.

935,565.

Patented Sept. 28, 1909.
3 SHEETS—SHEET 1.

Witnesses:

Inventor
Franz Trinks
By
James L. Norris
Atty.

F. TRINKS.
CALCULATING MACHINE.
APPLICATION FILED OCT. 21, 1908.
935,565.
Patented Sept. 28, 1909.
3 SHEETS—SHEET 2.
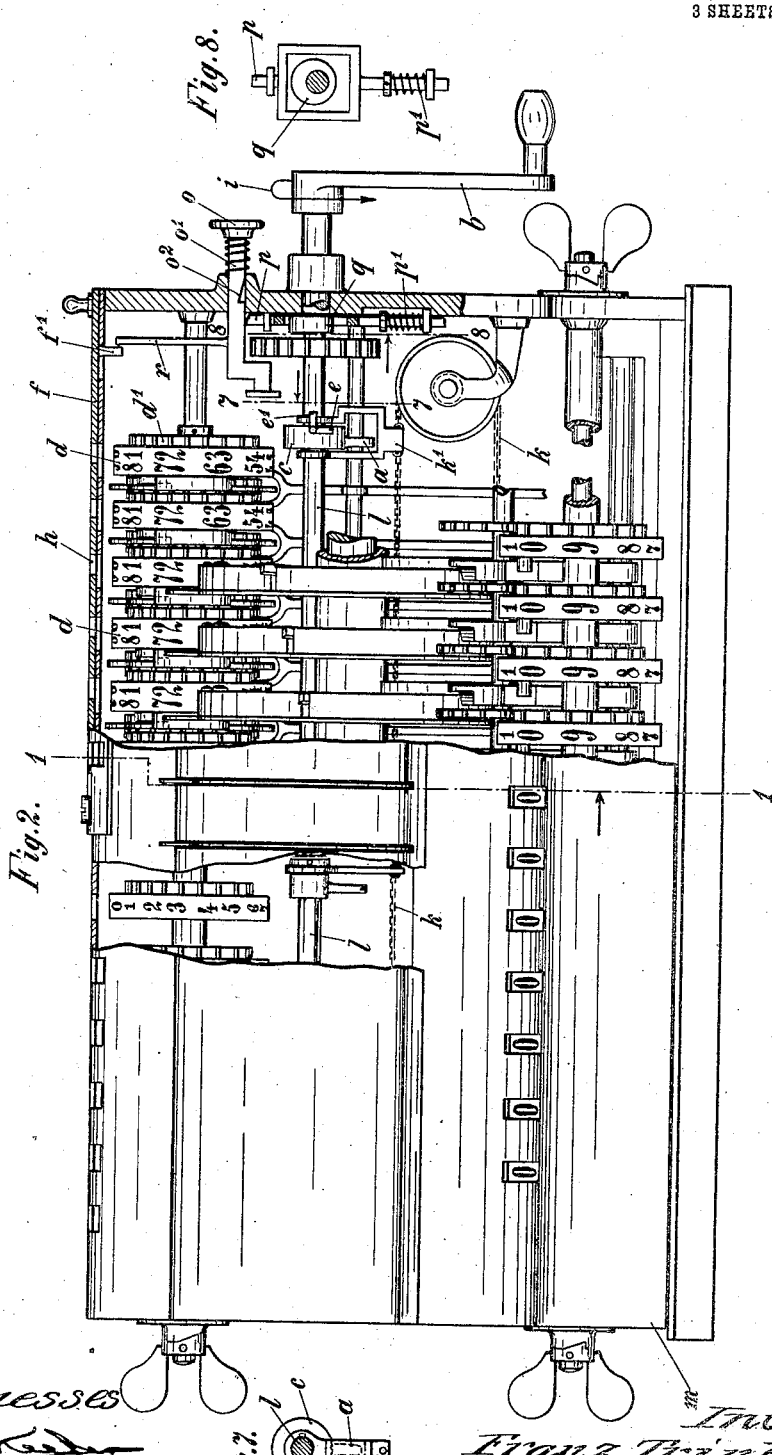

F. TRINKS.
CALCULATING MACHINE.
APPLICATION FILED OCT. 21, 1908.
935,565.
Patented Sept. 28, 1909.
3 SHEETS—SHEET 3.
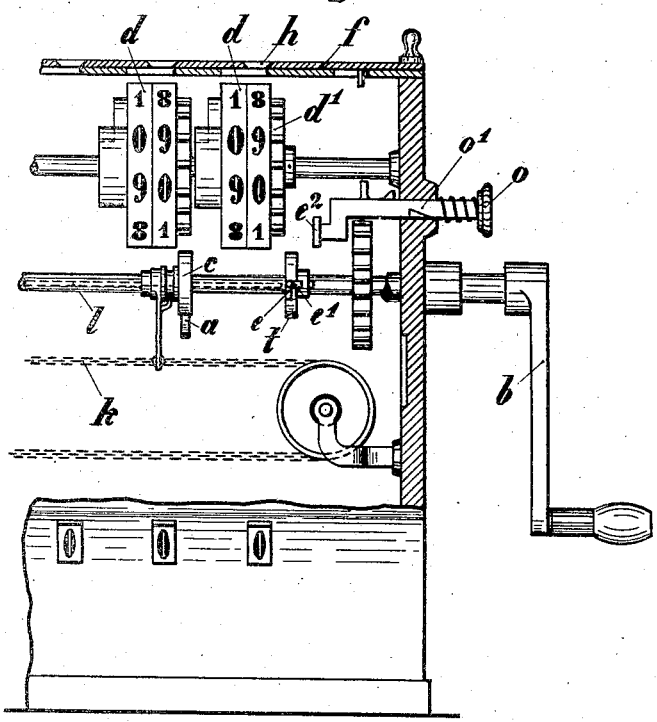
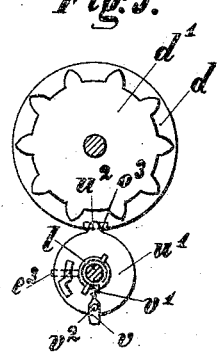
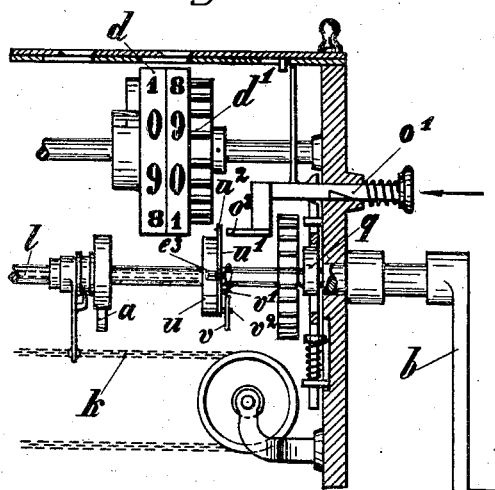
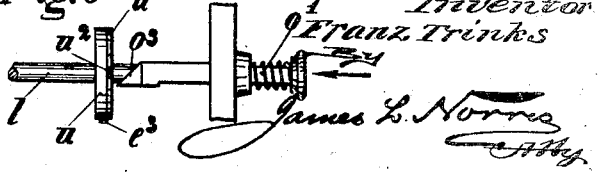

UNITED STATES PATENT OFFICE.

FRANZ TRINKS, OF BRUNSWICK, GERMANY

CALCULATING-MACHINE.

935,565.

Specification of Letters Patent. Patented Sept. 28, 1909.

Application filed October 21, 1908. Serial No. 458,873.

*To all whom it may concern:*

Be it known that I, FRANZ TRINKS, engineer, subject of the Emperor of Germany, residing at Brunswick, Duchy of Brunswick, Empire of Germany, have invented certain new and useful Improvements in Calculating-Machines, of which the following is a specification.

This invention relates to improvements in calculating machines, and more particularly to machines of that class comprising two revolution counting mechanisms, one of which is used in performing ordinary calculating operations, and the other used when performing what is known as a simplified calculating operation. An example of a machine of this class is described in my copending application Serial Number 406,442 filed December 14, 1907. In this machine the counting mechanism used for performing simplified operations is provided with tens transferring means, and each of its counting wheels has two series of figures which are exposed through a peep hole or sight opening formed in a slide movable on the cover of the casing. To insure a tens transfer at the proper time, though the machine crank is rotated in opposite directions when performing an addition or a subtraction, the figures of both series of the counting wheels are displaced relatively to each other the distance of one division, in such manner that in the initial position and when the slide is set for performing an addition, the zeros of the series of figures designed for additions are visible, the slide being shifted to expose the nines of the series of figures for performing subtraction. If the machine is operated to perform simplified subtraction the nines of the counting wheel will therefore be shown or exposed through the peep holes or sight openings of the slide instead of the zeros as in the initial position for performing division. To arrange the machine for subtraction the crank must be rotated in a proper direction to move the zeros in front of the peep holes through the medium of the tens transferring means, and by so rotating the crank the remaining counting mechanism, which has its driving mechanism operatively connected with the first operated counting mechanism, is also moved the distance of a value. Therefore, in the subtraction position of the slide, a position of rest of both counting mechanism cannot be obtained except by means of the zero setting shaft of an ordinary counting mechanism.

The operation as just specified is for many reasons disadvantageous, and the object of the present improvement is to avoid the necessity for such operation or dispense with a special crank revolution or a zero setting operation.

In this improved machine means are provided whereby a counting wheel upon the first revolution of the crank in the direction required for performing subtraction is rotated the distance of two values instead of one value, the first part of the rotation being effected in the usual manner by means of a well known movable tooth means setting the zero to the counting wheels at the rear of the peep holes, and the remaining revolution is effected by additional means which moves the numeral "1" so as to be visible through the first peep hole, according to the single revolution of the crank.

To more clearly illustrate the invention, several examples embodying the same have been shown in the accompanying drawings, and therein:—

Figure 1 is a transverse vertical section on the line 1—1, Fig. 2, and embodying the features of the invention. Fig. 2 is a partial longitudinal section of the machine. Fig. 3 is a longitudinal section of a portion of the machine illustrating a modification. Fig. 4 is a view similar to Fig. 3, illustrating a further modification. Fig. 5 is a cross-sectional view through a portion of the mechanism shown by Fig. 4. Fig. 6 is a detail elevation illustrating a modification of the push rod used in Fig. 4. Fig. 7 is a detail cross-sectional view on the line 7—7, Fig. 2. Fig. 8 is a detail cross-sectional view on the line 8—8, Fig. 2.

Referring particularly to Figs. 1, 2, 7 and 8, the well known driving wheel $c$ for the counting mechanism $d$ is mounted on the driving shaft $l$ which is operated by the machine crank $b$, and said said driving wheel is in the present instance provided with an additional or second tooth $e$ which is normally in inoperative position with relation to the counting wheel adjacent to the said driving wheel, the said additional tooth when in operative position acting but once upon the first revolution of the crank, or by a single revolution of the crank, conjointly with the tooth $a$, and after the said tooth $e$ has performed its function it is automatically thrown out of operation. By this means the counting wheel, by a single revolution of the crank in the direction of the arrow $i$ as shown by Fig. 1, in performing subtraction, is advanced the distance of two values, namely, the distance of one value by the operation of the tooth $e$ moving the zeros of the counting wheels in front of the peep hole or sight opening $h$, and a second value by the operation of the tooth $a$, the latter by a single revolution of the machine crank moving the numeral 1 in front of the first peep hole or sight opening. As the two counting mechanisms are connected for relative operations they will both show the numeral "1" through the actuation of the mechanism just explained or the two teeth $a$, $e$ and their coöperating parts.

Within the calculating machine, as in the machine disclosed by my application hereinbefore noted, is a longitudinally shiftable counting mechanism $m$ at a point below the coöperating counting mechanism embodying the counting wheels $d$ with the two sets of numerals thereon as hereinbefore referred to. Connected to the counting mechanism $m$ and extending longitudinally of the machine is an endless band or chain $k$ which moves over suitable grooved pulleys or sheaves and is maintained at a proper degree of tautness. Connected to the endless band or chain $k$ is a fork $k'$ which engages and is shiftable on the crank shaft $l$ and the two members of the fork embrace the driving wheel $c$, as clearly shown by Fig. 2. By this means the driving wheel $c$ is shifted or advanced the same distance as the main counting mechanism $m$ but in a direction opposite to the latter, for example, if the main counting mechanism is shifted to the right the driving wheel $c$ is correspondingly shifted to the left owing to the interposition and actuation of the endless band or chain $k$. The tooth $a$ of the driving wheel $c$ is normally disposed to operate with or engage the teeth $d'$, but the tooth $e$ is normally in such position as to pass or be out of engagement relatively to the said teeth $d'$. The tooth $e$ is of angular contour, swings or moves on a vertical pivot carried by the wheel $c$, and embodies an angular arm $e'$ by means of which the said tooth is positioned to engage the teeth $d'$ by devices which will now be explained. Extending through the end of the casing of the machine adjacent to the counting wheel $c$ is a push button $o$ having an elongated stem with an inner angular terminal $o^3$, the push button being exteriorly operative and engaged by a coiled spring $o'$ to retract the said button and its stem or to restore the same to normal position when released. The stem of the push button at an intermediate point is provided with a catch notch $o^2$ and in advance of said notch and located within the casing the push button stem has a finger $r$ projecting upwardly therefrom to engage a projection or tappet $f'$ of a slide $f$ which is movable to control the open and closed condition of the peep holes or sights formed in the casing over the wheels $d$, the slide $f$ having openings therein as at $h$ of less extent than the peep holes or sight openings in the casing of the machine, or of sufficient extent to disclose one set of numerals of the double set of numerals on each wheel $d$. The inner angular extremity $o^3$ has a terminal finger $e^2$ which serves as an abutment to engage the angular tooth $e$ or the projecting arm $e'$ of the latter to dispose the said tooth in the path of the teeth $d'$ when the said push button is forced inwardly, and simultaneously with the disposition of the tooth $e$ in operative relation to the teeth $d'$ the slide $f$ is moved through the medium of the finger $r$ engaging the projection or tappet $f'$ and the proper series of numerals on the counting wheels $d$ exposed in accordance with the movement of the said wheels.

It is necessary to lock the push button in its depressed position to cause it to perform its function during the manipulation of the machine crank and to avoid the necessity of the operator holding the said button and its stem depressed, and to accomplish this object a latch bar $p$ is mounted for vertical sliding movement against the inner surface of the end of the casing through which the said push button and its stem are operative, the said latch bar being retracted against the resistance of a spring $p'$ which normally tends to force the latch bar upwardly. The upper end of the latch bar $p$ continually bears against the lower portion of the stem of the push button $o$, and when the stem of the button is forced inwardly a sufficient distance the spring $p'$ causes the upper end of the latch bar to engage the notch $o^2$ and locks the push button in depressed position for a certain period of time or until the first revolution of the machine crank has been completed and the tooth $e$ has acted on the teeth $d'$. The latch bar $p$ is retracted at the proper time by a cam $q$ mounted on the crank shaft $l$, the said latch bar having a rectangular yoke loosely extending over the cam and the latter automatically engaging the lower wall of the said yoke to depress the latch bar against the resistance of the spring $p'$. As soon as the cam $q$ operates to depress the latch bar $p$ and release the upper end of the latter from the notch $o^2$, the push button and its stem returns to normal position and the finger or abutment $e^2$ is thrown out of operative engagement with relation to the angular tooth $e$ and the driving wheel $c$ may then be returned to its normal position by a reverse shifting movement of the main counting mechanism $m$ through the medium of the endless band or chain $k$. It will be understood that the movement of the slide $f$ to the left as just explained simultaneously with the disposition of the tooth $e$ in operative relation to the teeth $d'$ is effected when subtraction is to be performed and the said slide in this position displays the left hand series of digits on the wheels $d$. When the push button $o$ and its stem are released and return to normal position the slide $f$ may be manually shifted to the right by the operator.

In the operation thus far described, the second tooth cannot be disposed in operative position except when the units counting wheel is used, or in other words this particular mechanism embodying the second tooth is solely associated with the units counting wheel, and it would not be practicable to arrange the push button so that it would operate with the higher values or to provide it with an abutment for each of the value positions because when operating the second tooth $e$ in a higher value position, only this value position and the succeeding higher value positions would be moved from nine to zero by reason of the fact that the tens transferring mechanism is operative solely for actuating the higher value position from a lower one. Therefore, the construction thus far described can be used merely in such cases in which simplified subtraction is preceded by a usual subtraction, but not vice versa.

To adapt the invention to all the possibilities of calculation, that is, to such cases in which the calculating operation begins directly with the simplified substraction in a higher value position, the mechanism shown by Fig. 3 is provided and is as follows: In this form of the machine the tooth $e$ is independent of the driving wheel $c$ and is carried on a disk $t$ or on an analogous device secured to the shaft $l$ so that the said tooth $e$ is in position to engage the teeth $d'$ of the first counting wheel $d$ which is of the lowest order, the said tooth $e$ being preferably thrown into and out of operative relation to the teeth $d'$ by the same mechanism disclosed by Figs. 1 and 2 and hereinbefore fully described.

Instead of the form of tooth $e$ which has a pivotal or swinging action, any other displaceable tooth may be provided, for example, a radially displaceable tooth thrown into operation by means of a rotary cam disk adjacent to the tooth disk, the said cam disk for the purpose of throwing the tooth out of operation is stopped at the end of a revolution of the machine crank and operates to retract the tooth. An example of this modification is illustrated by Figs. 4 to 6 and the mechanism is as follows: Opposite the teeth $d'$ of the first counting wheel $d$ a disk $u$ is secured to the shaft $l$, the said disk being provided with a radially movable tooth $e^3$ controlled by an adjacent rotary cam disk $u'$. When forcing the push button and its stem inwardly in the direction of the arrow, such operation causes the tooth $e^3$ to be projected outwardly from the circumference of the disk $u$ by means of a beveled face $o^4$ of the stem of the push button striking against a lug $u^2$ of the cam disk $u'$ and rotating the latter, and after this projection of the tooth $e^3$ ensues and the teeth $d'$ have been engaged to effect the operation of the first counting wheel as desired, the continued rotation of the shaft $l$ through the operation of the machine crank will cause an automatic retraction of the tooth $e^3$ by means of a spring-pressed lever $v$ mounted on the cam disk $u'$, the said lever striking against the stem of the push button, the latter still being held projected inwardly by mechanism hereinbefore explained, the latter operation taking place while the disk $u$ continues to rotate. After fully withdrawing the tooth $e^3$ into the disk $u$, and upon further rotation of the machine crank $b$, the resistance of the spring $v'$ holding the lever $v$ in its locking position is overcome, and the said lever $v$ swinging about its pivot $v^2$ passes below the stem of the push button, the said stem being released by a cam or eccentric $q$, as hereinbefore explained.

To set forth the invention more clearly, two examples of calculating operations are now given, one of which examples relates to multiplication, and the other to simplified substraction of products, and are as follows:—

*First example: Simplified multiplication.*

Problem: 99.453.
Calculation: 100.453 — 453.
Solution: (1) Set the machine to show 453 on the adjusting mechanism. (2) Move the carriage carrying the main counting mechanism the distance of two values to the right. (3) Perform a complete rotation of the crank in the plus direction, which means multiplication with 100. The main counting mechanism now shows the number 45300, and each of the revolution counting mechanisms shows the number 100. (4) Return the carriage of the main counting mechanism to initial position. (5) Perform one rotation of the crank in the minus direction. Now the main counting mechanism shows the correct result, that is 45300 — 453 = 44847. The revolution counting mechanism $d$ shows the number 99. The indication of the other revolution counting mechanism is not controlling.

*Second example: Abbreviated subtraction.*

Problem: 1000 — 9.87.
Calculation: 1000 — 10.87 + 87.
Solution: (1) Set the number 1000 and transmit the same to the main counting mechanism by rotating the crank in the plus direction. (2) Set both revolution counting mechanisms to zero, and substitute, on the setting mechanism, the number 1000 by the number 87. (3) Move the carriage of the main counting mechanism the distance of one value to the right. (4) Rotate the crank in the minus direction, that is subtract 10.87. The main counting mechanism shows the number 130 and the revolution counting mechanisms the number 10. (5) Return the carriage carrying the main counting mechanism into initial position. (6) Rotate the crank in the plus direction, that is, perform the addition of 87. Now the main counting mechanism shows the correct result 217, and the revolution counting mechanism provided with tens transferring means shows the number 9. The indication of the other revolution counting mechanism is not controlling.

What is claimed is:

1. In a calculating machine, the combination with a counting mechanism provided with counting disks having two series of figures displaced relatively to each other the distance of one value, and operating means for said counting mechanism, of normally inoperative means to actuate said counting mechanism, means to operatively connect said normally inoperative means with the operating means, and automatic means to throw the same out of operation after the first revolution of the operating means.

2. In a calculating machine, the combination with a counting mechanism provided with counting disks having two series of figures displaced relatively to each other the distance of one value, and operating means for said counting mechanism, of normally inoperative means to actuate said counting mechanism, means to operatively connect said normally inoperative means with the operating means, automatic means to throw the same out of operation after the first revolution of the operating means, a slide adapted to cover either one of the series of figures on said disks, and an operative connection between said slide and said means for operatively connecting the normally inoperative means with the operating means.

3. In a calculating machine, the combination with a counting mechanism provided with counting disks having two series of figures displaced relatively to each other the distance of one value, and operating means for said counting mechanism, of normally inoperative means to actuate said counting mechanism, said means being located independently of the driving means for the counting mechanism and adjacent to the counting wheel of the lowest order, means to operatively connect said normally inoperative means with the operating means, and automatic means to throw the same out of operation after the first revolution of the operating means.

In testimony whereof I have hereunto set my hand in presence of two subscribing witnesses.

FRANZ TRINKS.

Witnesses:
PAUL BOCK,
WILHELM LEHRKE.